United States Patent [19]

Stade

[11] Patent Number: 5,287,631
[45] Date of Patent: Feb. 22, 1994

[54] PRECISION EXTENDED-LENGTH MICROMETER WITH DISPLACEMENT METER PROBE ADAPTER

[75] Inventor: Ronald J. Stade, 60 Beech Dr., Apt. #117, Schaumburg, Ill. 60193

[73] Assignee: Ronald J. Stade, Ill.

[21] Appl. No.: 807,991

[22] Filed: Dec. 16, 1991

[51] Int. Cl.[5] .............................................. G01B 3/18
[52] U.S. Cl. ...................................... 33/823; 33/820; 33/810
[58] Field of Search ................. 33/823, 824, 828, 803, 33/810, 811, 820, 501.6, 783, 784, 818–819, 821, 831, 805

[56] References Cited

U.S. PATENT DOCUMENTS

| 923,446 | 6/1909 | Schellenbach . |
| 1,490,413 | 4/1924 | Blood . |
| 1,512,823 | 10/1924 | Darlington . |
| 1,829,323 | 10/1931 | Witter et al. . |
| 1,981,153 | 11/1934 | Schoof ................................ 33/803 |
| 2,445,402 | 7/1948 | Malmberg . |
| 2,724,186 | 11/1955 | Lenart . |
| 3,104,470 | 9/1963 | Plante ................................ 33/501.06 |
| 4,561,185 | 12/1985 | Sakata et al. . |

FOREIGN PATENT DOCUMENTS 10127 of 1909 United Kingdom .

OTHER PUBLICATIONS

Mitutoyo Operation Manual for Model M300 Series 519 Mu-Checkers, Manual No. 4242,35 pgs.
Optodyne advertisement, "Linear Measurement Enhancement Package", 2 pgs., date unknown.
Optodyne catalog sheet, "Laser Doppler Displacement Meter", 6 pgs., date unknown.
Optodyne advertisement, "Break the Precision Barrier", 2 pgs., date unknown.
Pratt & Whitney "External Supermicrometer" User Manual, 39 pgs. 1987.
Pratt & Whitney "Metrology Laboratory Measurement Systems" catalog sheet, 5 pgs., date unknown.
Pratt & Whitney "Electrolimit Supermicrometer Model B" Instruction Book, No. G200-1, 1980, 23 pgs.
Pratt & Whitney "Mechanical and Electrolimit Supermicrometer Model A" Instruction Book, No. 300PW7-63, 20 pgs., date unknown.

Primary Examiner—William A. Cuchlinski, Jr.
Assistant Examiner—C. W. Fulton
Attorney, Agent, or Firm—Welsh & Katz, Ltd.

[57] ABSTRACT

A cylindrical beam-type micrometer measurement system is disclosed having an extended-length measuring range of 0–100 inches or more, and an accuracy of approximately 0.000005 inches (5 microinches), and which is designed as a retrofit to the widely-used Mechanical Supermicrometer, Model A, manufactured by Pratt & Whitney. In order to maintain accuracy with a 10-foot cylindrical beam, one or more center pedestals are used to support the middle portion of the beam, and a modified tailstock housing is moveably secured to the beam using a dovetail slot and clamp configuration. This arrangement allows the tailstock to be freely moved over the center pedestals to accommodate objects of different lengths. A displacement meter probe adapter assembly is also provided, which permits a Mechanical Supermicrometer tailstock to be used with an electrical displacement meter and probe.

35 Claims, 4 Drawing Sheets

PRECISION EXTENDED-LENGTH MICROMETER WITH DISPLACEMENT METER PROBE ADAPTER

BACKGROUND OF THE INVENTION

The present invention generally relates to measuring instruments for "standards room" or "measuring laboratory" accuracies, where measurements on the order of one hundred-thousandths (0.00001) of an inch are required. More specifically, the present invention relates to improvements for a cylindrical beam-type mechanical micrometer, such as the Supermicrometer Model A, manufactured by Pratt & Whitney.

Cylindrical beam-type mechanical micrometers have been used at least as early as 1924, when U.S. Pat. No. 1,490,413 was issued to B. H. Blood of the Pratt & Whitney Company. Basically, this type of micrometer is comprised of a cylindrical beam or bed of approximately four inches in diameter and two feet in length, having support legs at both ends so that it may rest upon a bench or table. At one end of the beam is a fixed-position head assembly, called a headstock, while moveably attached to the center portion of the beam is a tail assembly, called a tailstock. The headstock includes a measuring spindle with a calibrated dial, and the tailstock includes an anvil. The tailstock may be adjusted toward or away from the headstock to accommodate the length of the object to be measured, such that the length of the object falls within the one-inch measuring range of the spindle.

One particular brand of cylindrical beam-type micrometers have been widely used throughout the industry, namely, the Pratt & Whitney "Supermicrometer". Two basic models of the Supermicrometer were manufactured by Pratt & Whitney, i.e., the Mechanical Supermicrometer and the Electrolimit Supermicrometer. These two micrometers exhibit the same structural configuration except for the tailstock. The Mechanical Supermicrometer uses a mechanical pressure tailstock, while the Electrolimit Supermicrometer uses an electrical gauge in conjunction with an indicating meter to measure the tailstock pressure. Neither version of the Pratt & Whitney Supermicrometer has been available for some time. Nevertheless, the Pratt & Whitney Supermicrometer remains as one of the most widely used measuring instruments today.

The Mechanical Supermicrometer is a compact precision measuring instrument which is very similar to that shown in the aforementioned U.S. Pat. No. 1,490,413. It consists of a micrometer headstock with a precision measuring spindle that permits accurate measurements within its one-inch range of travel, and a mechanical pressure tailstock which provides a uniform measuring pressure of 1 pound or 2½ pounds for all readings. Both the headstock and tailstock are mounted on a two-foot cylindrical beam, which provides a measuring range of 0–10 inches. The Mechanical Supermicrometer has an accuracy to 0.0001 inch (100 microinches).

The tailstock of the Electrolimit Supermicrometer is similar to that of the Mechanical Supermicrometer, in that it can be adjusted to allow measurements of objects of up to 10 inches in length. However, an electrical transducer is used in the tailstock anvil gauge head instead of a mechanical needle indicator. A portable displacement-measuring instrument cabinet is connected to the Electrolimit tailstock gauge head to indicate the correct measuring pressure when the instrument is used as a micrometer, and to give an indication of size when used as a comparator. When the gauge head armature is at the midpoint of its travel, a zero reading is indicated on the meter in the instrument cabinet. Any deviation of the tailstock anvil from this position will be indicated on the meter. Therefore, actual length measurements can be read directly from the headstock dial of the measuring spindle at the same accuracy as that of the Mechanical Supermicrometer, i.e., 0.0001 inches (100 microinches). When used as a comparator, the tailstock anvil is set at the desired measuring pressure, a zero size master is used to calibrate the meter at zero, and the deviation from the master size is read directly from the meter scale. When used in this manner, deviation in product size may be read directly from the meter to 0.00002 inches (20 microinches). Nonetheless, the Electrolimit Supermicrometer is still limited to measuring objects having a length of less than 10 inches.

In order to increase the measuring range capability of micrometers, various manufacturers, including Pratt & Whitney, generally abandoned the cylindrical beam-type Supermicrometer structure in favor of a long, flat, heavy, cast and seasoned iron bar-type measuring system. The flat bar-type structure rests on a precisely flat granite table, which provides the required stability to minimize influences on the integrity of the measuring system. Such bar-type systems have extended measuring ranges of up to 120 inches, but can obtain an accuracy of no better than 0.00005 inches (50 microinches). Due to the structural design changes in the flat bar-type measuring systems from the cylindrical beam-type micrometers, no parts are common between the two types of units. Hence, in order to measure objects of greater than 10 inches in length, a whole new measuring system must be purchased. Moreover, the cost of the extended-length flat bar-type systems is many times that of the Pratt & Whitney Supermicrometers.

Recently, at least one company has designed an upgrade package for the Pratt & Whitney Mechanical Supermicrometer to improve its accuracy. Optodyne, Inc., of Compton, Calif., offers a laser retrofit assembly for the headstock of the Supermicrometer. Using a modulated light beam from a helium-neon laser reflected off the measuring spindle of the Supermicrometer headstock, the laser retrofit package can improve the accuracy of the Mechanical Supermicrometer by at least a factor of ten, i.e., to an accuracy of within 0.00001 (10 microinches). Even with the laser retrofit package, however, the Supermicrometer is still limited to its original measuring range of 0–10 inches. Moreover, the laser requires at least a 60 minute warm-up time, and requires the use of an IBM-PC or compatible computer for certain types of calibration. Although the laser can be retrofit to the Supermicrometer, the laser retrofit package cannot be installed by the user, and is still too expensive for many small businesses.

A need, therefore, exists for a precision micrometer capable of measuring objects greater than ten inches in length to a high degree of accuracy at a relatively low cost.

OBJECTS AND SUMMARY OF THE INVENTION

Accordingly, it is an object of the present invention to provide an improved micrometer capable of measuring objects having a length greater than one foot.

Another object of the present invention is to improve the accuracy of the standard cylindrical beam-type mechanical micrometer.

A further object of the present invention is to provide a method and means to allow users to upgrade their Pratt & Whitney Mechanical Supermicrometers to increase both the accuracy and the measuring range at a relatively low cost.

These and other objects are achieved by the present invention, of which one aspect, briefly described, is a cylindrical beam-type micrometer adapted to measure objects of greater than 12 inches in length, the micrometer comprising: a cylindrical beam having its longitudinal axis oriented parallel to and spaced from a planar surface, the beam having first and second end portions and a middle portion, and having first and second feet disposed at the first and second end portions, respectively, for supporting the first and second end portions on the planar surface, the beam having a length of greater than 24 inches, and further having at least one slot extending longitudinally along the outside surface of the beam over at least the middle portion; a headstock fixedly attached to the beam at the second end portion, the headstock having a measuring anvil and a rotatable spindle with a graduated dial which cooperate to move the headstock anvil less than 2 inches along its longitudinal axis and parallel to the longitudinal axis of the beam; a tailstock having a base moveably attached to the cylindrical beam at the middle portion, the tailstock base including a mechanism for clamping the tailstock to the beam by engaging with the beam slot, the tailstock base surrounding only a first portion of the circumference of the beam when moved longitudinally along the axis of and over the surface of the beam, the tailstock including a measuring anvil having its longitudinal axis positioned in line with the longitudinal axis of the headstock anvil; and a pedestal for supporting the cylindrical beam on the planar surface at the middle portion, the pedestal contacting the beam only at a second portion of the circumference of the beam other than the first portion such that the tailstock is adapted to be moved over the surface of the beam throughout the middle portion without contacting the pedestal, and such that the micrometer has a measuring range from zero to at least 12 inches without removing the pedestal.

According to another aspect of the present invention, a method is provided for adapting a cylindrical beam-type mechanical micrometer to be used with an electronic displacement meter having a remote probe, the remote probe having a body and a moveable tip, the micrometer having a cylindrical beam, a headstock fixedly attached to the beam, a tailstock moveably attached to the beam, the tailstock having a housing, a measuring anvil assembly disposed within the housing, and a cover enclosing the anvil assembly, the tailstock anvil assembly having a fixed base coupled to an elongated moveable anvil head wherein the anvil head is positioned such that its longitudinal axis is parallel to the longitudinal axis of the beam and such that the anvil head is adapted to move along its longitudinal axis, the method comprising the steps of: removing the cover from the tailstock housing; removing the anvil assembly from the tailstock housing; gluing a contact block to one surface of the anvil head such that a major surface of the contact block is disposed perpendicular to both the surface of the anvil head and to the longitudinal axis of the anvil head; providing an aperture for a remote probe within the tailstock housing; attaching a probe clamp to the outside of the tailstock housing; replacing the anvil assembly within the tailstock housing; clamping the body of the probe to the outside of the tailstock housing with the probe clamp such that the tip of the probe extends within the housing and engages the major surface of the contact block, and such that the axis of movement of the probe tip is perpendicular to the major surface of the contact block; and replacing the cover on the tailstock housing.

A further aspect of the present invention provides an adapter assembly for adapting a cylindrical beam-type mechanical micrometer, such as a Pratt & Whitney Supermicrometer Model A, for use with an electrical displacement meter, the micrometer including a tailstock having a housing moveably attached to the cylindrical beam, the tailstock having a measuring anvil assembly disposed within an upper portion of the housing, the tailstock anvil assembly having a fixed base coupled to an elongated moveable anvil head by a spring mechanism such that the anvil head is positioned with its longitudinal axis parallel to the longitudinal axis of the beam and such that the anvil head is adapted to move along its longitudinal axis, the anvil head having upper and lower planar surfaces, the adapter assembly comprising: a contact block constructed and arranged to freely fit within the tailstock housing and to be attached to the lower surface of the tailstock anvil head, the contact block having a front planar surface and having a bottom planar surface constructed to be at precisely a 90° angle to the front planar surface, and adapted to be attached to the lower surface of the tailstock anvil head within the tailstock housing such that its front planar surface is positioned at precisely a 90° angle to the lower surface of the tailstock anvil head, and such that its front planar surface is positioned at precisely a 90° angle to the axis of movement of the anvil head such that the contact block freely moves within the tailstock housing with the movement of the anvil head; a sufficient amount of cyanoacrylate-type glue for gluing the bottom planar surface of the contact block to the lower surface of the tailstock anvil head such that the contact block is adapted to be securely affixed thereto without disrupting the integrity of the tailstock anvil head; and a probe clamp for mounting a displacement meter probe to the tailstock housing, the probe clamp constructed and arranged to be securely affixed to an external surface of the tailstock housing such that the majority of a body portion of the probe remains external to the tailstock housing while a tip portion of the probe protrudes within the tailstock housing and engages the contact block affixed to the lower surface of the tailstock anvil head, and such that the axis of movement of the probe tip is at precisely a 90° angle to the front planar surface of the contact block.

BRIEF DESCRIPTION OF THE DRAWINGS

The features of the present invention which are believed to be novel are set forth with particularity in the appended claims. The invention itself, however, together with further objects and advantages thereof, may best be understood by reference to the following description when taken in conjunction with the accompanying drawings, in the several figures of which like-referenced numerals identify like elements, and in which:

DETAILED DESCRIPTION

Figure 1:
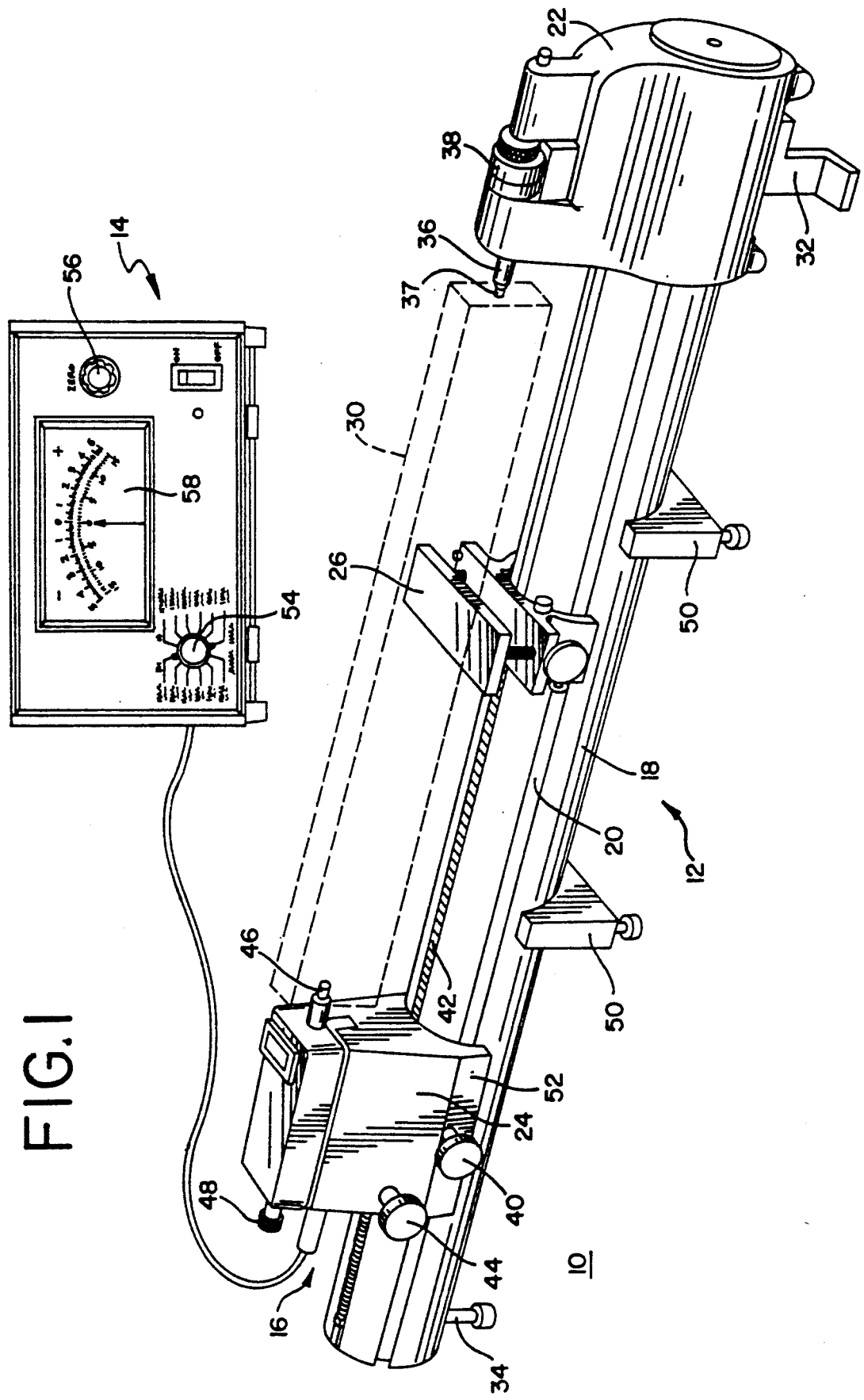
FIG. 1 is a perspective view of a precision measuring system in accordance with the present invention.

Referring now to the drawings, FIG. 1 illustrates a precision measuring system 10 in accordance with one aspect of the present invention. The measuring system 10 includes an extended-length cylindrical beam-type micrometer 12, a displacement meter 14, and its associated probe 16. In the preferred embodiment, the extended-length micrometer 12 is a modification of the Pratt & Whitney Mechanical Supermicrometer, Model A, which is widely used throughout the industry. The Pratt & Whitney Mechanical Supermicrometer is very similar to the linear measuring machine described in U.S. Pat. No. 1,490,413, which is hereby incorporated by reference.

The micrometer 12 is comprised of an extended-length cylindrical beam or bed 18 having a lengthwise slot 20 on each side, a headstock 22 securely fixed to one end of the cylindrical beam 18, and a tailstock 24, positioned on the top surface of the beam, which is moveably secured to the beam as will be described below. Also located on the top surface of the beam is an elevation table 26, which is used for supporting an object 30, the length of which is to be measured.

The headstock 22 of FIG. 1 is the same as the headstock of the Pratt & Whitney Mechanical Supermicrometer without any modifications. The headstock 22 is securely attached to the beam 18 using screws or, in an alternative embodiment, a headstock clamp as will be seen below. The headstock has two legs 32 which support the headstock and one end of the beam, the other end being supported by a single adjustable tail end leg 34, such that the beam is parallel to and spaced above a horizontal planar surface such as a table or workbench. Included within the headstock 22 is a measuring spindle 36, including a headstock anvil 37, both which move along their longitudinal axis over a distance of one inch. A headstock dial 38, which is typically calibrated in thousandths of an inch, measures the distance of travel of the headstock spindle 36.

The tailstock 24 of FIG. 1 is a modification of the Pratt & Whitney Mechanical Supermicrometer tailstock. The tailstock 24 is secured to the beam 18 using a tailstock clamp 40 which cooperates with the slot 20 in the beam 18, as will be described below in detail. A rack gear 42 cooperates with a pinion gear 44 mounted on the tailstock to move the tailstock lengthwise across the top surface of the beam 18. A tailstock anvil 46 is mounted to the tailstock housing as described below. A pressure control knob 48, affixed to the rear surface of the tailstock 24, is used to select or adjust the amount of pressure applied to the object 30 through the tailstock anvil 46 during the measuring process.

As stated above, the measuring range of the Pratt & Whitney Supermicrometer is limited to 0–10 inches. The measuring range of the present invention depends upon the length of the beam used, which, in turn, depends upon the measuring range requirements for a particular application. In the preferred embodiment of the present invention, the length of the extended beam 18 is 120 inches (10 feet), such that objects of over 100 inches (approximately 8½ feet) in length can be measured. In an alternate embodiment of the present invention, a 72-inch (6 foot) beam is used, which provides a measuring range of approximately 0–54 inches (0–approximately 4½ feet). In still another embodiment, the measuring range of the extended-length micrometer 12 is approximately 0–34 inches using a 48-inch beam. In any case, the length of the beam 18 is greater than 24 inches, such that a measuring range of at least 0–12 inches can be achieved.

In developing the extended-length cylindrical beam micrometer, it was found that the accuracy of the device was not consistent over the extended measuring range. Furthermore, it was discovered that this inconsistency was due to an imperceptible bending or bowing of the beam. This bowing phenomenon was not evident with the two-foot cylindrical beam used with the original Pratt & Whitney Supermicrometer. According to the invention, it has been found that, to maintain the accuracy of the extended-length cylindrical beam micrometer 12, the micrometer 12 includes one or more center pedestals 50 positioned under the middle portion of the beam 18 in order to prevent it from sagging or bowing. Generally, one center pedestal 50 should be used for a 4-foot beam, two center pedestals for a 6-foot beam, etc., such that the middle portion of the beam 18 is supported by center pedestals 50 located approximately every 24 inches.

If the standard Supermicrometer tailstock were used with the extended-length micrometer 12, the tailstock would completely encircle the beam 18 such that the tailstock could not freely move along the length of the beam to cover the entire measuring range. If the center pedestals 50 were semi-permanently attached to the beam using bolts or screws, the micrometer would then have to be disassembled to move the tailstock each time an object differing by more than 14 inches was measured. Moreover, the center pedestals could not be used at regular intervals along the beam since the tailstock housing would interfere with the center pedestal at certain points within the measuring range. The removal of a pedestal at the same location as the tailstock either allowed the beam to sag at the unsupported location of the tailstock, or at least required the irregular placement of center pedestals under the beam.

In the preferred embodiment of the present invention, the center pedestals 50 are not permanently attached to the underside of the beam 18, but instead are designed to cradle the beam and thus be held in place using only the weight of the beam. Even using this design for the center pedestals 50, the user would be required to remove and replace one center pedestal each time the tailstock is moved by more than 14 inches. Although removing and replacing a center pedestal 50 is not a difficult procedure, the accuracy of the micrometer 12 could be affected. Moreover, it is highly undesirable to disturb the placement or foundation of a precision micrometer just before a measurement is taken. On the other hand, it is very time consuming and inefficient to wait for the micrometer to restabilize after each movement of a center pedestal.

To remedy this problem, the construction of the tailstock 24 and the cylindrical beam 18 have been altered from that of the Pratt & Whitney Supermicrometers to accommodate the presence of the center pedestals 50 under the middle portion of the beam 18. As will be seen below, the lower portions of the sides 52 of the tailstock 24 have been removed and a tailstock clamp 40 has been adapted for use with the beam slot 20 to secure the sides 52 of the tailstock 24 to the beam 18. In this manner, the tailstock 24 can freely move over the top surface of the beam 18 in order to cover the entire measurement range, while the center pedestals can support the underside of the beam 18 without being disturbed.

Referring again to FIG. 1 to describe the operation of the measurement system 10, the tailstock clamp 40 is first loosened such that the tailstock 24 can be moved along the length of the beam 18 using the pinion gear 44 engaged in the rack gear 42. Then the tailstock 24 is securely fastened, using the tailstock clamp 40 engaged in the beam slot 20, at the position necessary to accommodate the measurement of the closest standard gage block placed upon the elevation table 26. The pressure control knob 48 adjusts the measuring pressure applied to the tailstock anvil 46, and the headstock spindle 36 is turned in order to bring the headstock anvil 37 into contact with the gage block. Once the anvils are at the correct measurement pressure, the calibrated dial 38 on the headstock spindle 36 is zeroed. The displacement meter 14 is also zeroed at this time using a range adjust knob 54, a zero adjust knob 56, and a center-zero meter 58.

To measure the length of an object, the measuring spindle 36 is then retracted, the standard gage block is removed, and the object 30 to be measured is put in its place. The headstock anvil 37 is then brought into contact with the object 30 using the headstock spindle 36 until the calibration dial 38 reads the same as the zero mark used during the calibration procedure. The probe 16 converts the difference in pressure at the tailstock anvil 46 into an electrical signal which can be read by the displacement meter 14. Hence, the length of the object 30 is found by adding the length of the standard gage block to the measurement taken from the meter 58. In this manner, accuracies to approximately 0.000005 inches (5 microinches) can be achieved throughout the entire measurement range of, for example, 0–120 inches.

Although the threads of the measuring spindle 36 are specially designed to assure an accurate rate of spindle travel uniformly at every point along its path, the accuracy of this thread pitch would normally be a factor in the accuracy of the measurement for the mechanical Supermicrometer. However, using the displacement meter 14, any variation in thread pitch of the headstock measuring spindle 36 is eliminated from the measurement, since the headstock spindle 36 is brought back to the same zero mark each time using the calibrated dial 38.

Figure 2:
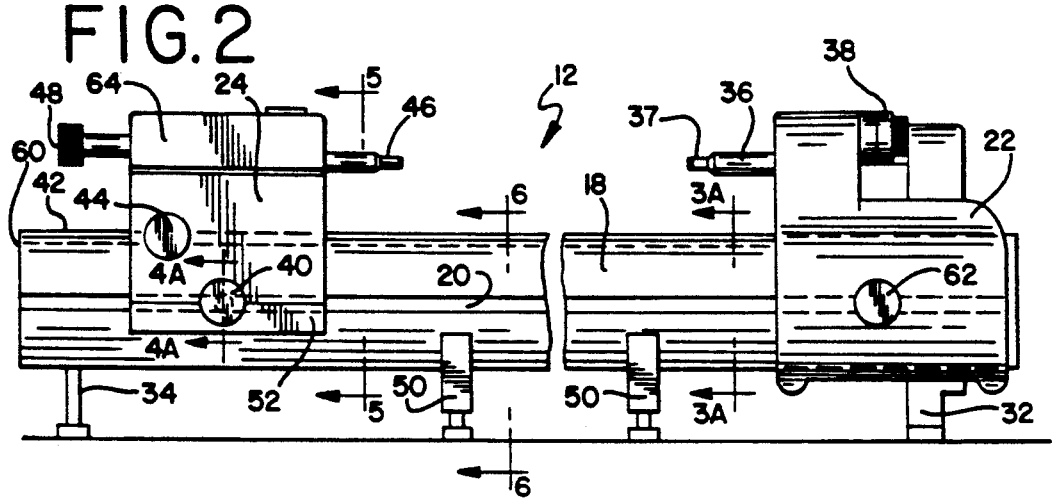
FIG. 2 is an elevational view of the precision extended-length cylindrical beam-type micrometer of the present invention.

Referring now to FIG. 2, the extended-length cylindrical beam mechanical micrometer 12 will be described in more detail. Note that the micrometer 12 is shown in FIG. 2 without the displacement meter 14 or the probe 16, such that it can be used as a standard mechanical micrometer wherein the measurements are read directly from the calibrated dial 38 on the headstock spindle 36.

The cylindrical beam 18, in the preferred embodiment, is a heavy, chromium-plated, solid steel cylinder having a diameter of 3.75 inches, and a length of greater than 24 inches. The beam 18 has its longitudinal axis oriented parallel to and elevated above a horizontal planar surface, from which it is supported at the head end on the legs 32, which are an integral part of the headstock 22, at the tail end by the single fixed tail end support leg 34, typically a 3-inch (length)×½-inch (diameter) allen-head screw threaded into the bottom surface of the beam 18, and at the middle portion of the beam by one or more center pedestals 50. The design of the tail end leg 34 may also correspond to that of the center pedestal 50, if desired.

Figure 3A:
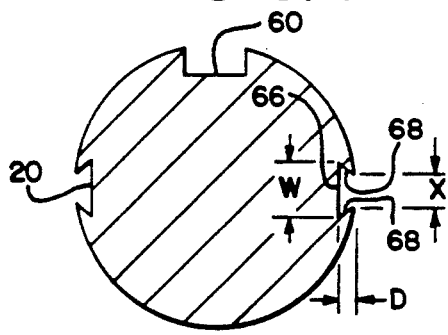
FIG. 3a is a cross-sectional view of the cylindrical beam taken across lines 3a—3a of FIG. 2.
Figure 4A:
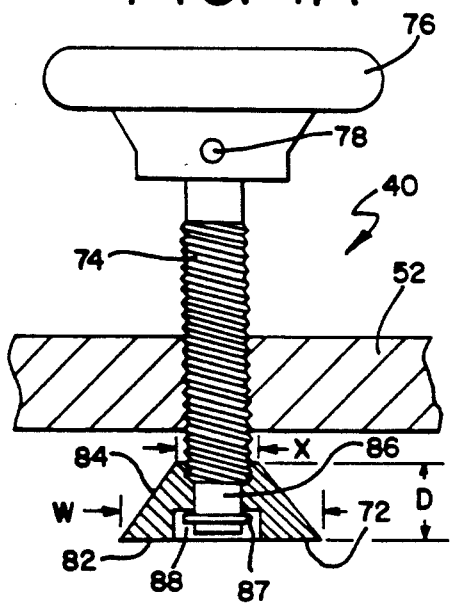
FIG. 4a is a partial cross-sectional view of a tailstock clamp for use with the cylindrical beam of FIG. 3a, taken across lines 4a—4a of FIG. 2.

The rack gear 42, which is located within a top channel 60 which runs along the top surface of the beam, provides a mechanism for adjusting the position of the tailstock. The top channel 60 and the rack gear 42 need only be provided along a middle portion of the beam 18 which can be reached by the tailstock pinion gear 44. A slot and clamp configuration, shown below in FIGS. 3a and 4a, are used to secure the sides 52 of the tailstock 24 to the beam 18.

A pair of beam slots 20 extend lengthwise along the outside surface of both sides of the beam, over at least its middle portion. Note that the length of the slot 20 need only extend slightly further toward the headstock 22 than the rack gear 42, since the tailstock clamp 40 would still remain a distance away from the headstock 22 even when the anvils 37 and 46 touch. However, the process of machining the longitudinal slots 20 in the beam 18 lends itself toward extending the slots along the entire length of the beam. In that case, a headstock clamp 62, which is similar to the tailstock clamp 40, may be used if desired.

The mechanical pressure tailstock assembly, located under the tailstock cover 64, provides either a 1 or 2½ pound pressure against the object to be measured when an indicator needle corresponds to the zero mark in the tailstock cover. These two measuring pressures are recommended by the National Bureau of Standards for measuring threads by the three-wire system. Either pressure is available in accordance with the setting of the pressure selecting knob 48 located at the rear end of the tailstock 24. In other micrometer versions, the pressure control knob 48 linearly adjusts the tailstock anvil pressure to provide a constant pressure of 2-48 ounces against the object 30.

Without the meter 14 and the probe 16, the accuracy of the micrometer 12 is limited to that of the original Pratt & Whitney Supermicrometer, i.e., 0.0001 inches (100 microinches). However, the extended-length micrometer 12 has the capability to measure objects of greater than 12 inches in length, which could not be accomplished using prior cylindrical beam-type micrometers.

FIG. 3a is a cross-sectional view of the cylindrical beam 18 taken across lines 3a—3a of FIG. 2. As can be seen from this cross-sectional view, the beam 18 is a solid cylinder having a top channel 60 for placement of the rack gear 42 (not shown), and a pair of dovetail slots 20 running lengthwise along opposite sides of the beam. Although the slots 20 are shown in FIG. 3a as being horizontally aligned with the center of the beam, i.e., at precisely 180° apart, an alternative construction would be to raise or lower the beam slots as desired, so long as the tailstock 24 was still able to clear the top of the center pedestals 50.

In the preferred embodiment using the dovetail slot configuration shown in FIG. 3a, each beam slot 20 has a bottom surface 66 which is exactly perpendicular to a horizontal radius of the beam 18, and inclined side surfaces 68 constructed at approximately a 30° angle to the radius of the beam as shown. In the preferred embodiment, the major width (W) of the slot 20, as measured at the bottom surface 66, is 1.000 inches, while the minor width (X) of the slot, as measured at the outer surface of the beam, is 0.5000 inches. The depth (D) of the slot, as measured parallel to the radius of the beam, is 0.4330 inches.

FIG. 4a illustrates a partial cross-sectional view of the tailstock clamp 40 taken across lines 4a—4a of FIG. 2. In this embodiment, the tailstock clamp 40 is used with the dovetail slot 20 shown in FIG. 3a. The tailstock clamp 40 includes a dovetail-shaped clamp head 72 which is designed to swivel on the end of a screw 74 threaded through the side of the housing of the tailstock 24. The other end of the screw 74 terminates outside the tailstock with a knob 76 affixed to the screw 74 using a key pin 78 or other arrangement.

The tailstock clamp head 72 has a bottom surface 82 which has dimensions corresponding to the bottom surface 66 of the slot 20 of FIG. 3a. Similarly, the slanting side surfaces 84 of the head 72 are dimensioned to correspond to the inclined side surfaces 68 of the slot as shown. In the preferred embodiment, the major width (W') of the clamp head 72 is 0.9000 inches, the minor width (X') of the clamp head 72 is 0.4381 inches, and the depth (D') of the clamp head 72 is 0.4000 inches. The clamp head 72 has a throughhole 86 in which the reduced-diameter end of the screw 74 is inserted. A C-ring 87, which fits in a recess 88 on the bottom surface 82 of the head 72, retains the clamp head 72 on the screw 74, and allows it to swivel as the knob 76 is turned. Alternative constructions for the shape of the head 72, the knob 76, or the swivel mechanism may also be used.

The dovetail slot configuration permits the tailstock clamp head 72 to be retained in the slot when pulled outwardly, away from the center of the beam, when the knob 76 is turned. This outward pulling action draws the sides 52 of the tailstock 24 inwardly, toward the center of the beam 18, to secure the tailstock to the beam. This inward force on the sides 52 of the tailstock 24 provides a secure attachment to the beam 18 for accurate measurements. Note that the screw 74 is preferably reverse-threaded into the side of the tailstock 24, such that the knob 76 can still be turned clockwise to tighten the tailstock to the beam.

As will be apparent to those skilled in the art, alternative slot configurations, other than the dovetail slot configuration shown in FIG. 3a, may also be used. For example, a C-shaped, D-shaped, sideways L-shaped, sideways T-shaped, etc., slot configuration can also be used, as long as an internal major width or dimension of the slot is greater than the minor width of the slot at the external surface of the beam, such that some type of an outer surface lip exists to maintain the correspondingly-sized head of the tailstock clamp within the slot when an outwardly-pulling force is used.

Figure 3B:
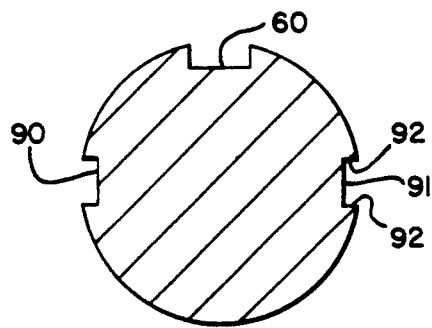
FIG. 3b is a cross-sectional view of an alternate embodiment of a cylindrical beam which can be used with the present invention, again taken across lines 3a—3a of FIG. 2.
Figure 4B:
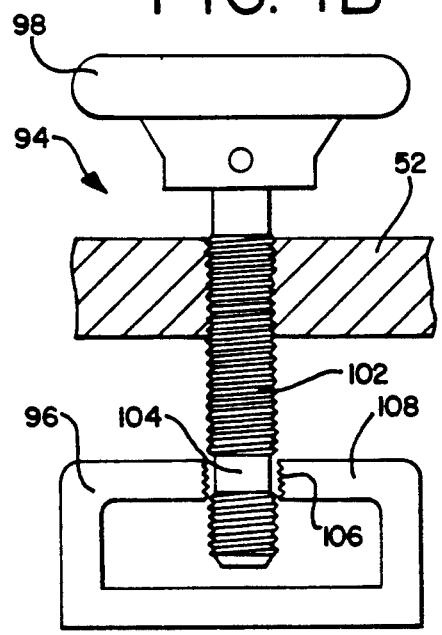
FIG. 4b is a partial cross-sectional view of an alternate embodiment of the tailstock clamp of FIG. 4a for use with the cylindrical beam of FIG. 3b, again taken across lines 4a—4a of FIG. 2.

Referring now to FIGS. 3b and 4b, an alternative embodiment for the configuration of the beam slot 20 and the corresponding tailstock clamp 40 is shown. In FIG. 3b, a rectangular slot 90 is shown having no outer surface lip, with a bottom surface 91 perpendicular to a horizontal radius of the beam, while the sidewalls 92 are perpendicular to the bottom surface 91. Using this type of slot configuration, an alternative tailstock clamp 94 of FIG. 4b must be used, wherein a clamp head 96 is substantially rectangular to fit within the slot 90. However, in this embodiment, the knob 98 of the tailstock clamp 94 is turned to force the clamp head 96 towards the center of the beam and into the slot 90, and force the sides 52 of the tailstock 24 away from the outer surface of the beam 18, in order to secure the tailstock to the beam. Note that the screw 102 has normal threads such that the knob 98 can again be turned clockwise to tighten the tailstock to the beam. A swivel mechanism is provided at the end of the screw 102 by having a threadless portion 104 of the screw 102 freely ride within a threaded hole 106 on the back portion 108 of the clamp head 94 as shown. Alternative constructions for the shape of the head 94, the knob 98, or the swivel mechanism may also be used.

Figure 5:
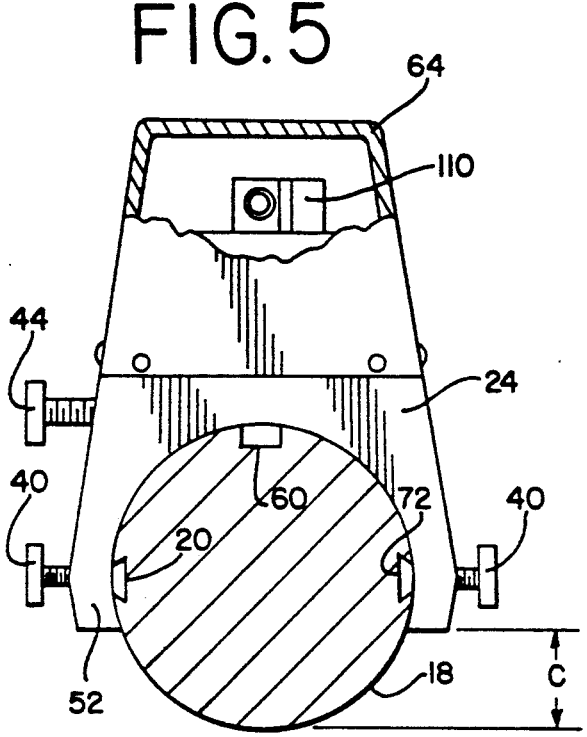
FIG. 5 is a partial cross-sectional view of the tailstock and cylindrical beam taken across lines 5—5 of FIG. 2.

FIG. 5 is a cross-sectional view of the beam 18 and a partial broken view of the tailstock 24 taken across lines 5—5 of FIG. 2. From this view, it can be seen that the dovetail slot and clamp configuration shown in FIGS. 3a and 4a are used to secure the sides 52 of the tailstock 24 to the beam 18. Moreover, it can be seen that the tailstock 24 has been modified from that of the original Pratt & Whitney Supermicrometer, such that it no longer encircles the cylindrical beam. FIG. 5 illustrates that the lower portion of the sides 52 of the tailstock 24 have been removed in order to allow the tailstock to freely pass over the center pedestal 50 (not shown). In the preferred embodiment, the sides 52 of the tailstock 24 extend slightly below the beam slots 20 and the tailstock clamps 40 such that a sufficient clearance (C) is provided, as measured from the bottom surface of the beam to the lowermost portion of the tailstock sides 52 as shown.

A tailstock anvil assembly 110 is located under the tailstock cover 64. If the micrometer 12 is used with the displacement meter 14 and probe 16 shown in FIG. 1, then the anvil assembly 110 would be modified as will be described below. On the other hand, if the micrometer 12 is used without the displacement meter and probe as shown in FIG. 2, then the anvil assembly 110 is the same as that used in the Pratt & Whitney Mechanical Supermicrometer.

Figure 6:
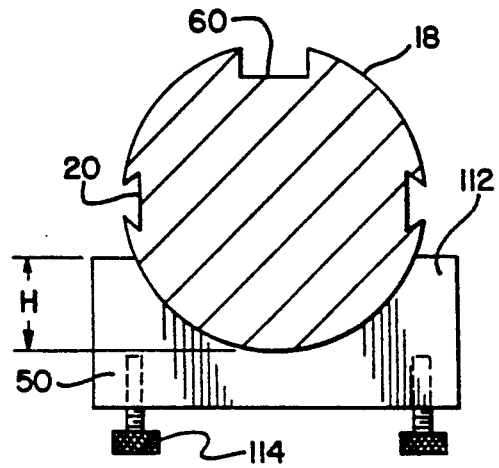
FIG. 6 is a partial cross-sectional view of a center support pedestal and cylindrical beam taken across lines 6—6 of FIG. 2.

FIG. 6 is a partial cross-sectional view of the cylindrical beam 18 and center pedestal 50 taken across the lines 6—6 of FIG. 2. The center pedestal 50 is designed to cradle the lower portion of the beam 18 as shown, while allowing sufficient clearance for the sides 52 of the tailstock 24 to freely pass over the pedestal 50. To that end, the height (H) of the side portions 112 of the pedestal 50, as measured from the bottom surface of the beam as shown, must be less than the clearance dimension (C) shown in FIG. 5. In the preferred embodiment, the diameter of the beam is 3.75 inches, the pedestal height (H) is 0.9370 inches, and the clearance (C) is 2.000 inches. Two adjusting screws 114 are used to level the pedestal 50 and to adjust its height above the table.

The center pedestal 50 of the preferred embodiment is retained in place solely by the weight of the beam 18, such that no additional machining of the beam 18 is required to attach the pedestal. However, since the tailstock 24 is preferably constructed such that it can freely pass over the center pedestals 50, each center pedestal 50 may be securely affixed to the beam 18 if desired. One alternative construction for the center pedestal 50 would be to use the single allen-head screw used for the tail end leg 34, as shown in FIG. 2, which would be threaded into the underside of the beam. Numerous alternative constructions for the center pedestal 50 are contemplated, which would sufficiently serve the purpose of supporting the middle portion of the beam.

Figure 7:
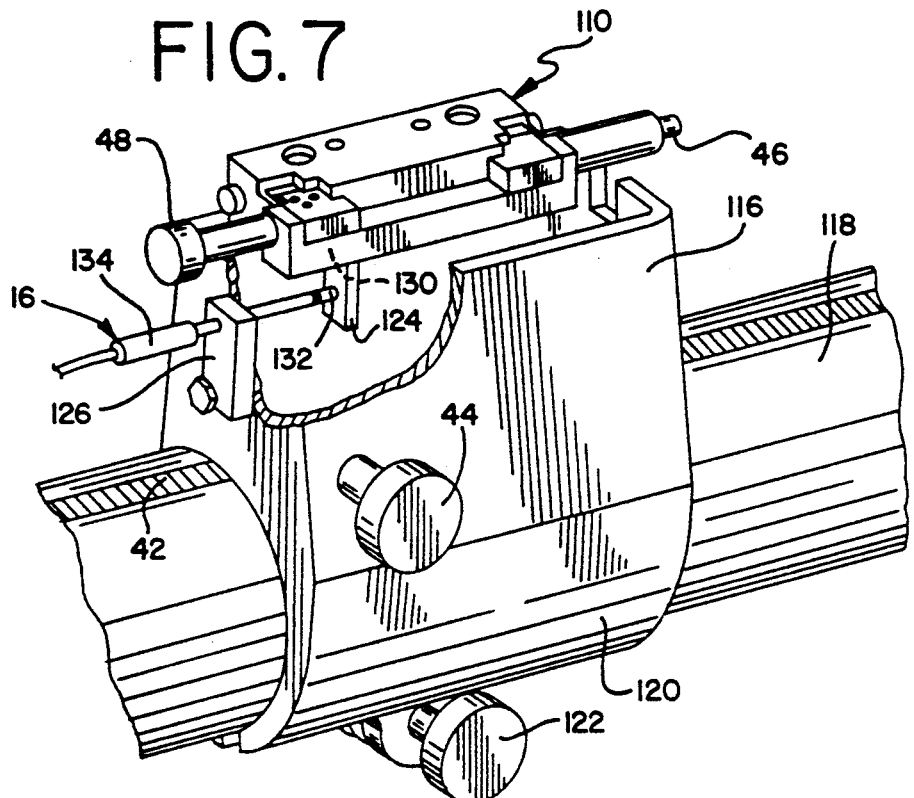
FIG. 7 is a rear perspective and partial broken view of a tailstock housing having the tailstock cover removed, illustrating the tailstock anvil assembly adapted for use with a displacement meter probe.

Turning now to FIG. 7, a perspective view of the rear portion of a tailstock is shown mounted on a cylindrical beam. According to one aspect of the invention, a standard Pratt & Whitney Mechanical Supermicrometer tailstock 116, mounted on a standard two-foot Pratt & Whitney cylindrical beam 118, can be adapted for use with the displacement meter 14 (not shown) and the probe 16 to improve the system measurement accuracy from approximately 0.0001 inches (100 microinches) to approximately 0.000005 inches (5 microinches). Note that, if the standard two-foot cylindrical beam of the Pratt & Whitney Supermicrometer is used, a center pedestal 50 need not be used, such that the lower portion 120 of the tailstock 116 need not be removed. Since the lower portion 120 of the tailstock 116 completely encircles the beam 118, a single tailstock clamp 122 is used to secure the tailstock to the beam. Thus, the beam 118 does not require the beam slots 20 described above.

According to the invention, the Pratt & Whitney Mechanical Supermicrometer, Model A, can be converted for use with an electrical displacement meter through the use of an adapter assembly comprised of a contact block 124, a probe clamp 126, and a small amount of cyanoacrylate-type glue 130. As shown in FIG. 7, the tailstock anvil assembly 110 has been converted for use with the probe 16, which extends through the rear of the tailstock 116. The tip 132 of the probe engages the contact block 124, and the body 134 of the probe is secured to the rear of the tailstock 116 as will be described below. In this manner, the standard Pratt & Whitney Supermicrometer can readily be retrofit to utilize the displacement meter to improve its accuracy by a factor of twenty, at a very low cost.

Figure 8A:
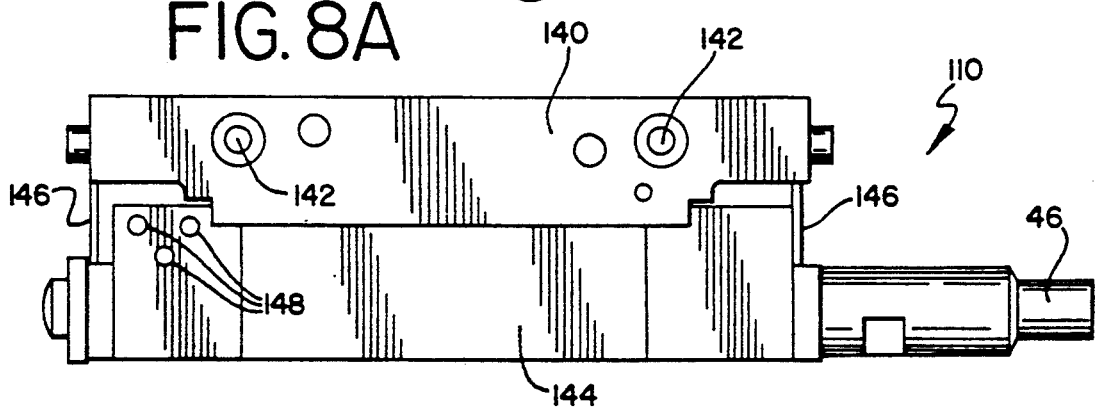
FIGS. 8a and 8b are top and bottom views, respectively, of the tailstock anvil assembly of FIG. 7.

FIG. 8a is a top view of the tailstock anvil assembly 110 of FIG. 7. The tailstock anvil assembly is comprised of two main portions: a fixed anvil base 140, secured to the tailstock 116 via screws 142, and a moveable anvil head 144, secured to the anvil base 140 via two parallel leaf springs 146 which allow longitudinal movement of the anvil head 144. In the original Mechanical Supermicrometer tailstock, three holes 148 are used to secure a mechanical indicator needle (not shown) to both the anvil base 140 and the anvil head 144 to give an indication of the relative movement of the anvil head. In the preferred embodiment, the indicator needle is removed and the indicator window in the tailstock cover is covered over, since a mechanical indication of the anvil pressure is no longer required.

Figure 8B:
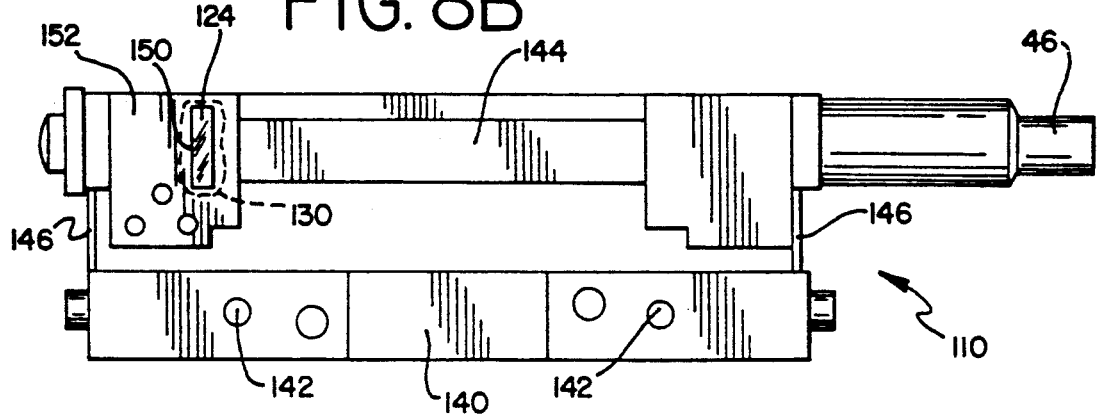

FIG. 8b is a bottom view of the tailstock anvil assembly 110. In this view, the moveable anvil head 144 is shown located above the fixed anvil base 140. Note that the contact block 124 is affixed to the rear lower surface 152 of the anvil head 144 using glue 130 as shown. A front major surface 150 of the contact block 124 is oriented such that it is exactly perpendicular to the rear lower surface 152 of the anvil head 144, and exactly perpendicular to the longitudinal axis of movement of the tailstock anvil 46.

Figure 9:
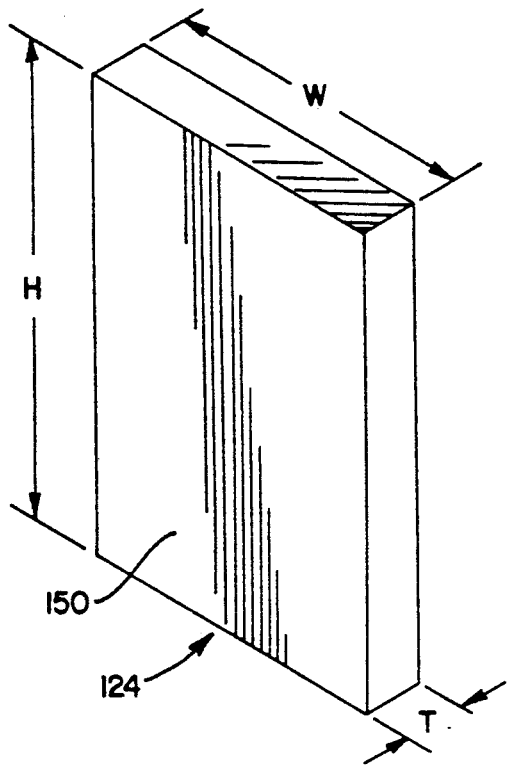
FIG. 9 is a perspective view of the probe contact block illustrated in FIGS. 7 and 8b.

FIG. 9 is a perspective view of the contact block 124 shown in FIGS. 7 and 8b. The contact block 124 is constructed to have dimensions such that it freely fits within the housing of the tailstock 116 when attached to the lower surface 152 of the moveable anvil head 144 as shown in FIG. 8b. In the preferred embodiment, the contact block 124 is constructed as a rectangular parallelepiped having a height (H) of 0.7500 inches, a width (W) of 0.7500 inches, and a thickness (T) of 0.5000 inches. The front major surface 150 of the contact block 124 is preferably finished to have a flatness specification of within 5 lightbands (0.000058 inches), such that, no matter where the probe tip 132 is positioned on the surface 150, the axis of movement of the probe tip is precisely at a 90° angle to the front surface 150 of the contact block 124. In this way, it can be assured that the probe tip 132 does not contact the surface 150 at any other angle than 90°, which could otherwise be caused by a groove or hole in the surface 150, and such that there will be minimal chance that the probe tip 132 will creep or climb along the surface 150 during the measurement.

Again referring to FIG. 8b, the location of the contact block 124 is illustrated as being perpendicular to both the rear lower surface 152 of the moveable anvil head 144 and to the axis of movement of the tailstock anvil 46. In the preferred embodiment, the contact block 124 is permanently fixed to the lower surface 152 of the anvil head 144 using a small amount of cyanoacrylate-type glue 130, commonly known as Superglue, manufactured by Loctite Corporation of Cleveland, Ohio, or Krazy Glue ®, distributed by Borden, Inc., of Columbus, Ohio.

Cyanoacrylate glue is used in the preferred embodiment for several reasons. First, the contact block 124 must be securely fastened to the anvil head 144 without any movement whatsoever, in order to maintain accurate readings on the displacement meter. There is no flexibility in the joint using cyanoacrylate glue. Even the slightest amount of movement, which may exist with other types of glue such as contact cement, could translate into significant measurement errors. Second, since the viscosity of cyanoacrylate glue is significantly less than other types of glue, a very thin layer of glue will exist between the contact block 124 and the lower surface 152. The thickness of this layer is very important, since the front surface 150 must be exactly perpendicular to the axis of movement of the probe tip. If a thicker glue were used, there is a significant chance that the front surface 150 would have a slight angle to the axis of movement of the probe tip, such that the probe tip would have a tendency to climb along the surface during the measurement process and cause inaccurate readings. Third, the process of gluing the contact block to the anvil head, as opposed to drilling, tapping, and fastening the contact block to the anvil head using screws, is a relatively simple procedure that can readily be performed by the user of the Pratt & Whitney Supermicrometer. Hence, there is no need to send the tailstock and/or tailstock anvil assembly out to a factory or machine shop for modification. Fourth, if holes were drilled into the anvil head 144 for mounting the contact block 124, the integrity of the anvil head and/or the alignment of the anvil head with respect to the anvil base could be disturbed. As can be appreciated by those skilled in the art, if the integrity or alignment of the anvil head is disrupted, the accuracy of the micrometer could be permanently affected. Similarly, any type of welding of the contact block to the anvil head could distort either piece and significantly degrade the accuracy of the measurement system.

Figure 10:
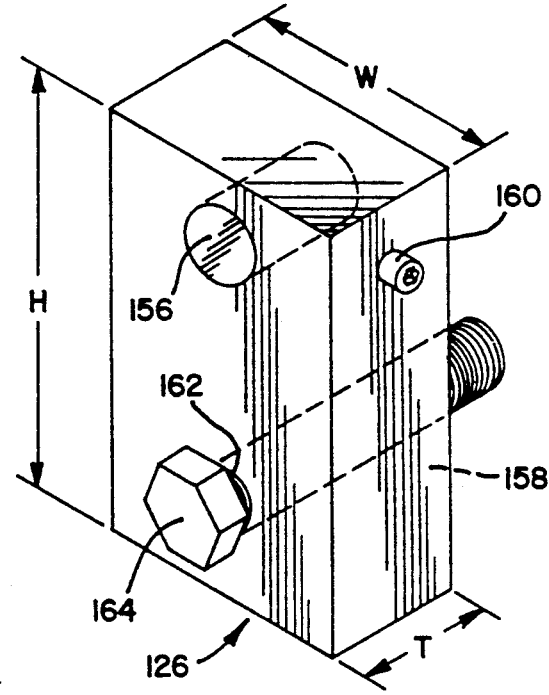
FIG. 10 is a perspective view of the probe clamp of FIG. 7.

FIG. 10 is a perspective view of the probe clamp 126 shown in FIG. 7. The probe clamp 126 is used to secure the body 134 of the probe 16 to the outside face of the rear of the tailstock 116. Only a portion of the probe, including the tip 132, is inserted within the tailstock housing. In the preferred embodiment, the probe clamp 126 is a also a rectangular parallelepiped, having a height (H) of 1.5000 inches, a width (W) of 1.0000 inches, and a thickness (T) of 0.3750 inches. A hole 156 extends through the clamp 126 as shown for mounting the probe. The diameter of the hole 156 will depend upon the diameter of the body of the probe used. However, the hole 156 must be drilled exactly perpendicular to the rear surface 158 of the probe clamp 126 in order to assure proper alignment of the probe. An allen-head screw or setscrew 160, threaded perpendicular to the hole 156, is used to secure the body of the probe to the clamp 126. Note that use of the setscrew 160 allows probes to be interchanged for different applications. A second hole 162, through which a 5/16"-18×1½-inch hex-head bolt 164 extends therethrough, is used to secure the probe clamp 126 to the outside rear surface of the tailstock 116. Alternative constructions and arrangements of the probe clamp 126 could be used for probe types and/or different tailstock housing configurations.

To install the probe 16 onto the tailstock 116, a hole is drilled in the rear surface of the tailstock 116, in line with the approximate center of the front surface 150 of the contact block 124, to allow the probe tip 132 to engage the contact block 124 as shown in FIG. 7. The diameter of the hole again depends upon the diameter of the body of the probe used. A second hole is drilled in the tailstock housing to align with the hole 162 of the probe clamp 126. The location of the first hole drilled in the housing for the probe will determine where the second hole would be drilled in order to accommodate the hex-head bolt 164 for the probe clamp 126. The second hole in the tailstock 116 is then threaded for the hex-head bolt 164.

Once the tailstock anvil assembly 110 is reinserted into the top of the tailstock housing, the probe 16 is attached using the probe clamp 126. The length of the tip 132 of the probe which extends into the tailstock housing can be adjusted using setscrew 160. The tailstock cover 64 is then replaced. After reassembling the tailstock, the probe cable is connected to the displacement meter 14. Although a wide variety of displacement meters can be used, the displacement meter used in the preferred embodiment is a Mitutoyo Mu-Checker, Model 519-302. This particular displacement meter is specified to have a resolution of 0.000005 inches (5 microinches) with +/−1% analog scale accuracy.

Using the displacement meter 14, the displacement of the tailstock anvil 46 and anvil head 144 is measured by the probe 16 as function of the force on the probe tip 132. In the preferred embodiment, the probe used is the Mitutoyo Model 519-332, however, a wide variety of probes may also be used. This particular probe is a transformer-type electronic linear gauging transducer with a moveable core, operating from a 5-13 kiloHertz sine wave, and configured as a half-bridge. The probe body 134 is comprised of a hard steel tube, hard chrome plated, having a body portion of length 2.795 inches and a diameter of 0.472 inches, and a tip portion of length 0.309 inches and a diameter of 0.375 inches. The tip 132 itself is comprised of a tungsten carbide ball, 0.156 inches in diameter, with a tip range of +/−0.02 inches and a measuring force of 0.25 Newton.

Since the probe 16 can readily be detached from the tailstock 116 by loosening the probe clamp setscrew 160, several different probes types or sizes can be interchanged for different applications. For example, probes having a half-bridge or full-bridge coil configuration, capacitance bridge configurations, or other types of transducers may be substituted. Furthermore, since the probe is a sealed unit, it is unaffected by dirt and humidity, and much less sensitive to temperature changes and electromagnetic and radio frequency interference than, for example, the LVDT gauge head used in the tailstock of the Pratt & Whitney Electrolimit Supermicrometer. Another advantage is that the probe can be removed for ease of repair. More importantly, in using the adapter assembly described above, the mechanical Supermicrometer can be retrofit, by the user, to be used with an electronic displacement meter and probe to improve the accuracy of the measuring system at a very low cost.

In review, it can now be seen that a precision extended-length cylindrical beam-type micrometer is provided which can measure objects having a length greater than 12 inches and an accuracy far greater than that of the standard mechanical cylindrical beam-type micrometer. Furthermore, the present invention provides a method and means to convert the Pratt & Whitney Mechanical Supermicrometer to be used with a displacement meter probe at a relatively low cost.

While only particular embodiments of the invention have been shown and described in detail, it will be obvious to those skilled in the art that further modifications and changes may be made thereto without departing from the invention in its broader aspects and, accordingly, the appended claims are intended to cover all such changes and alternative constructions that fall within the true spirit and scope of the invention.

What is claimed is:

1. A cylindrical beam-type micrometer comprising:
a cylindrical beam having its longitudinal axis oriented parallel to and spaced from a planar surface, said beam having first and second end portions and a middle portion, and having first and second foot means disposed approximately at said first and second end portions, respectively, for supporting said first and second end portions on said planar surface, said beam having at least one slot extending longitudinally along the outside surface of said beam over at least said middle portion;

a headstock fixedly attached to said beam at approximately the second end portion, said headstock having a measuring anvil and a rotatable spindle with a graduated dial which cooperate to move said headstock anvil along its longitudinal axis and substantially parallel to the longitudinal axis of said beam;

a tailstock having a base moveably attached to said cylindrical beam at said middle portion, said tailstock base including means for clamping said tailstock to said beam by engaging with said beam slot, said tailstock base surrounding only a first portion of the circumference of said beam when moved longitudinally along the axis of and over the surface of said beam, said tailstock including a measuring anvil having its longitudinal axis positioned substantially in line with the longitudinal axis of said headstock anvil; and pedestal means for supporting said cylindrical beam on said planar surface at said middle portion, said pedestal means contacting said beam only at a second portion of the circumference of said beam other than said first portion such that said tailstock is adapted to be moved over the surface of said beam throughout said middle portion without contacting said pedestal means.

2. The cylindrical beam-type micrometer according to claim 1, wherein said cylindrical beam has a length of at least 72 inches, wherein the measuring range of said micrometer is at least 0-50 inches, and wherein at least one pedestal means is positioned at the middle portion of said beam.

3. The cylindrical beam-type micrometer according to claim 1, wherein said cylindrical beam has two lengthwise side slots positioned on opposite sides of the surface of the beam, and wherein said tailstock base includes two means for clamping said tailstock to said beam by engaging said side slots.

4. The cylindrical beam-type micrometer according to claim 3, wherein said beam slot includes lip means, located at the surface of said beam, for retaining a portion of said tailstock clamping means within said beam slot when clamping said tailstock to said beam by pulling said portion of said clamping means away from said beam.

5. The cylindrical beam-type micrometer according to claim 3, wherein said two clamping means each include a threaded screw operating along an axis perpendicular to the longitudinal axis of said beam.

6. The cylindrical beam-type micrometer according to claim 1, wherein the cross section of said beam slot has a larger width dimension below the surface of said beam than at the surface of said beam, such that a portion of said tailstock clamping means is retained within said beam slot when clamping said tailstock to said beam.

7. The cylindrical beam-type micrometer according to claim 1, wherein the cross section of said beam slot resembles a dovetail configuration.

8. The cylindrical beam-type micrometer according to claim 1, wherein said tailstock clamping means cooperates with said beam slot to securely clamp the tailstock to said beam by drawing the sides of said tailstock inwardly toward said beam.

9. The cylindrical beam-type micrometer according to claim 1, wherein said first foot means includes a single leg at said first end portion, and wherein said second foot means includes two separate legs at said second end portion.

10. The cylindrical beam-type micrometer according to claim 1, wherein said pedestal means includes two adjustable feet adapted to adjust the height of said pedestal means.

11. The cylindrical beam-type micrometer according to claim 1, wherein said pedestal means is substantially U-shaped such that it functions as a cradle support under said beam.

12. The cylindrical beam-type micrometer according to claim 11, wherein said pedestal means is not securely attached to said beam such that it is held stationary under said beam solely by the weight of said beam.

13. The cylindrical beam-type micrometer according to claim 1, wherein said tailstock anvil includes an adapter bracket for mounting a probe to said tailstock, and further includes a contact plate for contacting the tip of said probe when mounted.

14. The cylindrical beam-type micrometer according to claim 13, wherein said contact plate has a front major surface exactly perpendicular to the longitudinal axis of said tailstock anvil.

15. The cylindrical beam-type micrometer according to claim 14, wherein said first major surface of said contact plate is exactly perpendicular to the longitudinal axis of said beam.

16. The cylindrical beam-type micrometer according to claim 13, wherein said contact plate is securely affixed to said tailstock anvil using only glue.

17. The cylindrical beam-type micrometer according to claim 16, wherein said glue includes cyanoacrylate.

18. A measurement system comprising:

an extended-length cylindrical-beam type micrometer having a measuring range of over 12 inches, said micrometer including:

a cylindrical beam having its longitudinal axis oriented parallel to and spaced from a planar surface, said beam having first and second end portions and a middle portion, and having first and second foot means disposed at said first and second end portions, respectively, for supporting said first and second end portions on said planar surface, said beam having a length of greater than 24 inches, and further having at least one slot extending longitudinally along the outside surface of said beam over at least said middle portion;

a headstock fixedly attached to said beam at the second end portion, said headstock having a measuring anvil and a rotatable spindle with a graduated dial which cooperate to move said headstock anvil less than 2 inches along its longitudinal axis and parallel to the longitudinal axis of said beam;

a tailstock having a base moveably attached to said cylindrical beam at said middle portion, said tailstock base including means for clamping said tailstock to said beam by engaging with said beam slot, said tailstock base surrounding only a first portion of the circumference of said beam when moved longitudinally along the axis of and over the surface of said beam, said tailstock including a measuring anvil assembly, said measuring anvil assembly having a fixed base coupled to an elongated moveable anvil head by a spring mechanism such that said anvil head is positioned with its longitudinal axis parallel to the longitudinal axis of said headstock anvil and such that said anvil head is adapted to move along its longitudinal axis, said tailstock further including a contact block attached to one surface of said anvil head such that a major surface of said contact block is disposed perpendicular to both the surface of said anvil head and its longitudinal axis; and pedestal means for supporting said cylindrical beam on said planar surface at said middle portion, said pedestal means contacting said beam only at a second portion of the circumference of said beam other than said first portion such that said tailstock is adapted to be moved over the surface of said beam throughout said middle portion without contacting said pedestal means, and such that said micrometer has a measuring range from zero to at least 12 inches without removing said pedestal means;

said system further comprising:

a displacement meter adapted to measure distances as a function of pressure applied to a probe;

a probe having a probe body and moveable tip, said probe coupled to said displacement meter and adapted to convert mechanical pressure applied to said tip into an electrical parameter which can be measured by said displacement meter, said probe being affixed to said tailstock such that a majority of said probe body extends out of said tailstock and such that said tip engages said contact block perpendicular to said major surface such that said tip moves along an axis parallel to said longitudinal axis of said anvil head.

19. An adapter assembly for adapting a cylindrical beam-type mechanical micrometer, such as a Pratt & Whitney supermicrometer Model A, for use with an electrical displacement meter, said micrometer including a tailstock having a housing moveably attached to said cylindrical beam, said tailstock having a measuring anvil assembly disposed within an upper portion of said housing, said anvil assembly having a fixed base coupled to an elongated moveable anvil head by a spring mechanism such that said anvil head is positioned with its longitudinal axis parallel to the longitudinal axis of said beam and such that said anvil head is adapted to move along its longitudinal axis, said anvil head having upper and lower planar surfaces, said adapter assembly comprising:

a contact block constructed and arranged to freely fit within said tailstock housing and to be attached to said lower surface of said anvil head, said contact block having a front planar surface and having a bottom planar surface constructed to be at precisely a 90° angle to said front planar surface, said bottom planar surface adapted to be attached to said lower surface of said tailstock anvil head within said tailstock housing such that its front planar surface is positioned at precisely a 90° angle to said lower surface of said tailstock anvil head, and such that its front planar surface is positioned at precisely a 90° angle to said axis of movement of said anvil head such that said contact block freely moves within said tailstock housing with the movement of said anvil head;

a sufficient amount of cyanoacrylate-type glue for gluing said bottom planar surface of said contact block to said lower surface of said tailstock anvil head such that said contact block is adapted to be securely affixed thereto; and a probe clamp for mounting a displacement meter probe to the tailstock housing, said probe clamp constructed and arranged to be securely affixed to an external surface of the tailstock housing such that the majority of a body portion of said probe remains external to said tailstock housing while a tip portion of said probe protrudes within said tailstock housing and engages the front planar surface of said contact block affixed to the lower surface of said tailstock anvil head, and such that the axis of movement of said probe tip is at precisely a 90° angle to the front planar surface of said contact block.

20. The adapter assembly according to claim 19 further comprising a probe constructed and arranged to convert pressure applied to its tip into an electrical signal to be measured by a displacement meter.

21. The adapter assembly according to claim 20, further comprising a displacement meter coupled to the probe such that the probe electrical signal is converted into a displacement measurement which can be observed by the user.

22. The adapter assembly according to claim 21, wherein said displacement meter has an accuracy of at least $+/-10$ microinches.

23. The adapter assembly according to claim 19, wherein said front planar surface of said contact block is constructed to have a flatness specification of less than 0.0001 inches.

24. The adapter assembly according to claim 19, wherein said contact block is constructed to substantially have the shape of a rectangular parallelepiped having a width between 0.25–1.50 inches, a height between 0.25–2.00 inches, and a thickness between 0.20–1.00 inches.

25. The adapter assembly according to claim 19, wherein said probe clamp is constructed to have a substantially flat major surface adapted to be affixed flush to the external surface of the tailstock housing, and further constructed to have a hole extending therethrough at precisely a 90° angle to the flat major surface, said hole having a size dimensioned to fit the body portion of the probe.

26. The adapter assembly according to claim 19, wherein said probe clamp is constructed to substantially have the shape of a rectangular parallelepiped having a width between 0.50–2.00 inches, a height between 0.75–3.00 inches, and a thickness between 0.20–1.00 inches.

27. A method for adapting a cylindrical beam-type mechanical micrometer for use with an electronic displacement meter having a remote probe, said remote probe having a body and a moveable tip, said micrometer having a cylindrical beam, a headstock fixedly attached to said beam, a tailstock moveably attached to said beam, said tailstock having a housing, a measuring anvil assembly disposed with said housing, and a cover enclosing said anvil assembly, said tailstock anvil assembly having a fixed base coupled to an elongated moveable anvil head wherein said anvil head is positioned such that its longitudinal axis is parallel to the longitudinal axis of said beam and such that said anvil head is adapted to move along its longitudinal axis, the method comprising the steps of:

removing the cover from the tailstock housing;

removing the anvil assembly from the tailstock housing;

gluing a contact block to one surface of the anvil head such that a major surface of the contact block is disposed perpendicular to both the surface of the anvil head and to the longitudinal axis of said anvil head;

providing an aperture for a remote probe within the tailstock housing;

attaching a probe clamp to the outside of the tailstock housing;

replacing the anvil assembly within the tailstock housing;

clamping the body of the probe to the outside of the tailstock housing with the probe clamp such that the tip of the probe extends within the housing and engages the major surface of the contact block, and such that the axis of movement of the probe tip is perpendicular to the major surface of the contact block; and replacing the cover on the tailstock housing.

28. The method according to claim 27, wherein said gluing step is accomplished using a cyanoacrylate-type glue.

29. The method according to claim 27, wherein said probe has a major longitudinal axis parallel to the cylindrical beam of the micrometer, and said wherein probe tip is adapted to move along said probe axis.

30. The method according to claim 29, wherein said probe clamping step includes the step of adjusting the body of the probe with respect to the tailstock housing, such that a force of between 0.10 and 2.00 Newtons are applied to said probe tip by said contact block when said tailstock assembly is calibrated for use.

31. The method according to claim 27, further comprising the step of attaching said probe to a displacement meter adapted to measure displacement as a function of force on the probe tip.

32. A method of modifying a cylindrical beam-type mechanical micrometer such that it is adapted to measure objects of over 24 inches in length, said micrometer having: an original cylindrical beam of less than 36 inches in length; at least two supporting feet, each located approximately at each end of the beam, for supporting the beam on a surface; a headstock fixedly attached to said beam; a tailstock moveably attached to said beam, said tailstock including a tailstock housing substantially encircling said beam, a measuring anvil assembly disposed within said tailstock housing, and a clamping mechanism disposed on a lower portion of said tailstock housing, the method comprising the steps of:

disassembling the original cylindrical beam from the headstock and the tailstock;

replacing the original cylindrical beam with an extended cylindrical beam having a length of over 36 inches;

machining a pair of longitudinal slots in the extended beam which are positioned approximately on opposing sides of the beam and which extend over at least the measuring range of the beam;

machining the tailstock to remove the lower portion of the housing and the clamping mechanism such that the tailstock housing no longer encircles the beam, such that an upper portion of the housing is adapted to rest on said beam, and such that two opposing side portions extend down the sides of the beam at least as far as the position of the longitudinal slots;

constructing a tailstock fastener for attachment to each side portion of the tailstock housing, such that one portion of the tailstock fastener disposed on the inner side of the housing is adapted to be slideably disposed within the longitudinal slots, and such that another portion of the tailstock fastener disposed on the outer side of the housing is adapted to be manually engaged to clamp the tailstock securely to the bean by engaging with the longitudinal slots;

providing a least one center pedestal for supporting the beam at approximately a middle portion of the beam;

assembling the headstock, the extended beam, and the center pedestal such that the beam is disposed on a planar surface and is supported on the surface at each end of the beam by said two support feet, and approximately in a middle portion of the beam by the center pedestal; and attaching the tailstock to the beam such that it moves along an upper surface of the beam and freely moves over the center pedestal when the tailstock fasteners are disengaged, and such that it is securely affixed to the beam when the tailstock fasteners are engaged.

33. The method according to claim 32, wherein said tailstock fastener cooperates with said longitudinal slot to securely clamp the tailstock to said beam by drawing the sides of said tailstock inwardly toward said beam.

34. The method according to claim 32, further comprising the steps of:

removing the measuring anvil assembly from within the upper portion of said tailstock housing;

attaching an adapter bracket to the outside surface of the tailstock housing for mounting a probe to the tailstock;

attaching a contact plate to the lower side of the measuring anvil assembly for contacting the tip of the probe when mounted; and assembling the measuring anvil assembly within the upper portion of said tailstock housing.

35. The method according to claim 34, wherein the step of attaching a contact plate to the lower side of the measuring anvil assembly includes the steps of:

positioning the contact plate such that the contact plate has a front major surface exactly perpendicular to the longitudinal axis of the tailstock anvil and exactly perpendicular to the longitudinal axis of the beam; and affixing the contact plate to the measuring anvil assembly using only glue, wherein the glue includes cyanoacrylate.

* * * * *